United States Patent
Salisbury et al.

(10) Patent No.: US 9,669,551 B1
(45) Date of Patent: Jun. 6, 2017

(54) ROBOTIC HAND AND FINGERS

(71) Applicant: Sandia Corporation, Albuquerque, NM (US)

(72) Inventors: Curt Michael Salisbury, Albuquerque, NM (US); Kevin J. Dullea, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/850,664

(22) Filed: Sep. 10, 2015

Related U.S. Application Data

(63) Continuation-in-part of application No. 14/047,625, filed on Oct. 7, 2013, now Pat. No. 9,138,897.

(60) Provisional application No. 61/817,555, filed on Apr. 30, 2013.

(51) Int. Cl.
*B25J 15/08* (2006.01)
*B25J 15/00* (2006.01)

(52) U.S. Cl.
CPC ........... *B25J 15/0009* (2013.01); *B25J 15/08* (2013.01); *Y10S 901/31* (2013.01); *Y10S 901/38* (2013.01)

(58) Field of Classification Search
CPC ........ B25J 15/0009; B25J 15/08; B25J 15/10; B25J 15/0233; Y10S 901/31; Y10S 901/38; Y10S 901/39; Y10S 901/49
USPC ......................................... 294/106, 111, 213
See application file for complete search history.

(56) References Cited

U.S. PATENT DOCUMENTS

| | | | | |
|---|---|---|---|---|
| 5,062,673 A | * | 11/1991 | Mimura | B25J 15/0009 294/106 |
| 5,360,249 A | * | 11/1994 | Monforte | B25J 15/0475 294/119.1 |
| 5,947,539 A | * | 9/1999 | Long | B25J 15/0028 294/119.1 |
| 6,435,582 B1 | * | 8/2002 | DaSilva | B25J 15/0052 294/87.1 |
| 6,517,132 B2 | * | 2/2003 | Matsuda | B25J 15/08 294/106 |
| 6,913,627 B2 | | 7/2005 | Matsuda | |
| 7,361,197 B2 | | 4/2008 | Winfrey | |
| 7,370,896 B2 | | 5/2008 | Anderson et al. | |
| 7,469,885 B2 | | 12/2008 | Englund et al. | |
| 8,052,185 B2 | * | 11/2011 | Madhani | B25J 15/0009 294/106 |
| 8,100,451 B2 | | 1/2012 | Okuda et al. | |
| 8,276,957 B2 | | 10/2012 | Shibamoto et al. | |
| 8,534,983 B2 | * | 9/2013 | Schoenfeld | B25J 15/0206 414/739 |
| 8,936,290 B1 | * | 1/2015 | Salisbury | B25J 19/065 294/111 |
| 9,138,897 B1 | * | 9/2015 | Salisbury | B25J 15/0009 |
| 2007/0035143 A1 | * | 2/2007 | Blackwell | B25J 9/104 294/111 |
| 2010/0259057 A1 | | 10/2010 | Madhani | |
| 2011/0017008 A1 | | 1/2011 | Kanayama | |

(Continued)

*Primary Examiner* — Dean Kramer
(74) *Attorney, Agent, or Firm* — Daniel J. Jenkins

(57) ABSTRACT

Technologies pertaining to a robotic hand are described herein. The robotic hand includes one or more fingers releasably attached to a robotic hand frame. The fingers can abduct and adduct as well as flex and tense. The fingers are releasably attached to the frame by magnets that allow for the fingers to detach from the frame when excess force is applied to the fingers.

4 Claims, 12 Drawing Sheets

(56) References Cited

U.S. PATENT DOCUMENTS

| | | | |
|---|---|---|---|
| 2011/0067520 A1* | 3/2011 | Ihrke | B25J 9/104 74/490.05 |
| 2011/0068593 A1 | 3/2011 | Meusel et al. | |
| 2011/0163561 A1* | 7/2011 | Kim | B25J 15/0009 294/111 |
| 2014/0132021 A1* | 5/2014 | Claffee | B25J 9/0015 294/198 |

\* cited by examiner

ROBOTIC HAND AND FINGERS

RELATED APPLICATION

This application is a continuation-in-part of and claims priority to U.S. patent application Ser. No. 14/047,624, filed on Oct. 7, 2013, and entitled "MECHANISMS FOR EMPLOYMENT WITH ROBOTIC EXTENSIONS, which claims priority to U.S. Provisional Patent Application No. 61/817,555, filed on Apr. 30, 2013, entitled "ROBOTIC HAND ASSEMBLY", the entireties of which are incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Advanced robotic mechanisms tend to be complex and expensive systems. In an example, a conventional robotic hand is associated with several motors that must operate with relatively precise timing to cause fingers (and links therein) of the robotic hand to be at desired positions. For instance, a plurality of motors, which are typically located in a forearm or otherwise external to the robotic hand, can drive a respective plurality of cables, which (when driven) are configured to move links of fingers of the robotic hand relative to one another. If an element of such robotic hand becomes damaged, at least a portion of the robotic hand must be disassembled. The damaged element is then removed, and a new (or repaired) element is placed therein, which must then be connected to appropriate mechanical, electrical, and/or electromechanical elements in the robotic hand. It can be ascertained that a robotic hand may be damaged somewhat easily during operation. For instance, if a link of a robotic finger is subject to a sudden external force, such force can impact the motor by way of the cable that is used to drive the link. Thus, for example, the motor may be operating such that its output shaft is rotating in a first direction, and when the external torsion force is applied to the link, the cabling can exert a force that causes the output shaft to suddenly stop or reverse direction, potentially damaging the motor (and/or associated gearing).

Additionally, conventional robotic hands are not well-suited for performing many tasks that are relatively easily performed by human hands. For instance, conventional robotic hands are typically not well-suited for the task of lifting a coin lying flat on table and depositing the coin at a desired deposit location. As exteriors of conventional robotic hands tend to be composed of a metal or hard plastic, grasping the coin can be difficult. To assist in maintaining the grasp, an adhesive may be applied to distal links of robotic fingers; however, the robotic hand may then have difficulty depositing the coin at the desired deposit location, as the coin adheres to the finger of the robotic hand.

Still further, conventionally it has been difficult to control operation of a robotic hand in an intuitive manner. For example, with respect to conventional robotic hands, specialized control panels have been employed, wherein the specialized control panels can include joysticks, sliders, etc. These types of human-machine interfaces, however, do not map to intuitive movements of the human hand. To make up for such deficiency, gloves have been designed for use in controlling a robotic hand, wherein an exemplary glove has a plurality of sensors thereon that are configured to output data that is indicative of movement of a human hand that is wearing the glove. A robotic hand can be controlled based upon the data output by the sensors. This approach, however, can be somewhat imprecise, as the glove is customized for a hand of a particular size (e.g., for a hand of a first user). If a second user wishes to control the robotic hand using the glove, and a hand of the second user is not of substantially similar size/shape as the hand of the first user, data output by the sensors may not be precisely indicative of location of, for example, a proximal phalange relative to a medial phalange of a particular finger.

SUMMARY

The following is a brief summary of subject matter that is described in greater detail herein. This summary is not intended to be limiting as to the scope of the claims.

Described herein are various technologies pertaining to a robotic hand and finger.

According to an embodiment of the disclosure, a robotic hand is disclosed that includes a frame and one or more mechanical fingers attached to the frame. At least one mechanical finger of the one or more mechanical fingers is releasably attached to the frame by one or more magnets.

According to an embodiment of the disclosure, a mechanical finger is disclosed that includes a base link comprising a proximal end and a distal end, wherein the proximal end comprises at least one magnet configured to attach the at least one finger to the frame; an intermediate link comprising a proximal end and a distal end, wherein the proximal end is attached to the distal end of the base link at a first joint configured to provide adduction and abduction between the base link and the intermediate link; a middle link comprising a proximal end and a distal end, wherein the proximal end is attached to the distal end of the intermediate link at a second joint configured to provide flexion and extension between the intermediate link and the middle link; and a distal link comprising a proximal end and a distal end, wherein the proximal end is attached to the distal end of the middle link at a third joint configured to provide flexion and extension between the middle link and the distal link.

In an exemplary embodiment, a protection apparatus can be utilized in a joint of the robotic hand to protect a motor that drives pivoting of a link about the joint. With more particularity, the robotic hand includes a robotic finger that comprises a first link that has a proximal end and a distal end, and a second link that has a proximal end and a distal end. A joint mechanically couples the distal end of the first link with the proximal end of the second link, wherein the second link is pivotable about the joint and can thus be displaced angularly relative to the first link. The joint can include the protection apparatus, wherein the protection apparatus comprises an input plate and an output plate. The input plate is mechanically coupled to the motor (e.g., by way of a cable) and is driven by the motor. Thus, rotation of an output shaft of the motor causes the input plate of the protection apparatus to likewise rotate.

The output plate is mechanically coupled to the input plate, and is further connected to the proximal end of the second link. When there is no external force applied to either the first link or the second link, the input plate and the output plate of the protection apparatus are tightly mechanically coupled, such that the input plate and the outlet plate rotate synchronously when the input plate is driven by the motor. When an external force is suddenly applied to either the first link or the second link, causing torque at the output plate about its axis of rotation to exceed a threshold, the input plate and the output plate become angularly displaced with respect to one another (e.g., the input plate and the output plate may rotate asynchronously). Thus, the protection apparatus is configured to absorb torque that would otherwise impact the motor.

Furthermore, at least a portion of the robotic hand (e.g., at least a tip of a distal link of a robotic finger) can have an anthropomorphic skin applied thereto. The skin can comprise an interior layer and an exterior layer, wherein the interior layer is formed of a first material and the exterior layer is formed of a second material. For example, the first material may have a thickness that is greater than a thickness of the second material. Further, stiffness of the material of the exterior layer may be greater than stiffness of the material of the interior layer.

In yet another exemplary embodiment, an apparatus that is particularly well-suited for intuitively controlling operation of a robotic hand is described herein. The mechanism is configured to measure angular displacement between phalanges of respective human fingers, regardless of size of a human hand upon which the apparatus is placed. Accordingly, the apparatus need not be recalibrated for each independent user.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
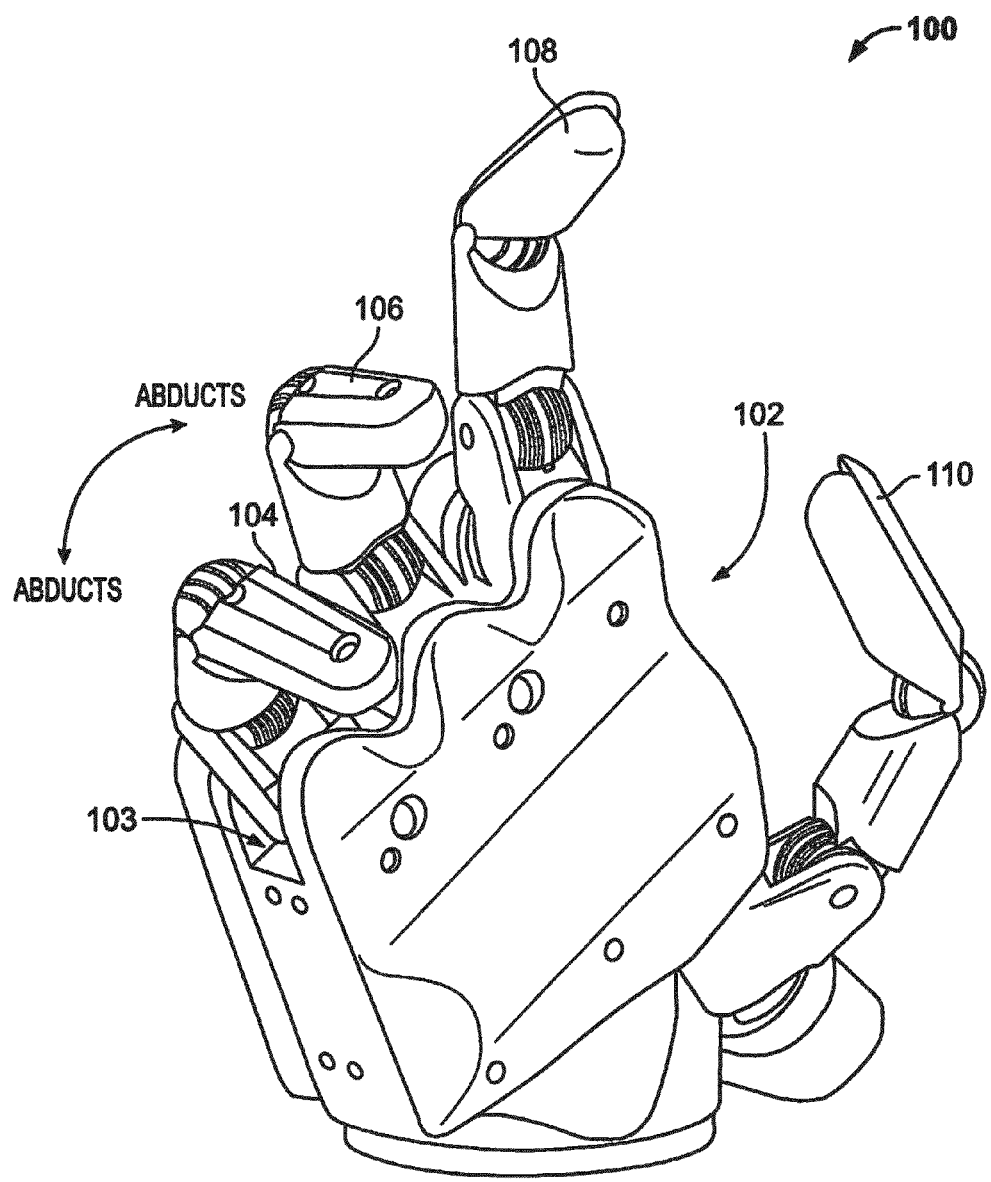
FIG. 1 illustrates an exemplary robotic hand.

Various technologies pertaining to a robotic hand are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

With reference now to FIG. 1, an isometric view of an exemplary robotic hand 100 is illustrated. The robotic hand 100 comprises a frame 102. In an exemplary embodiment, the frame 102 can comprise a plurality of receiving regions 103, wherein each receiving region can comprise respective electrical contacts (not shown), which may be spring contacts (rather than connectors).

The robotic hand 100 further comprises a plurality of modular robotic fingers 104-110 that are removably attachable to the frame 102 at the respective receiving regions of the frame 102. In this exemplary embodiment, actuators (motors) (224, see (FIG. 2B) are configured to cause robotic links (202, 203 204, 206, see FIGS. 2-2B) of a respective modular robotic finger to move relative to other robotic links are located in the respective modular fingers 104-110, rather than the frame 102. In other embodiments, such motors may be included in the frame 102 or external to the robotic hand 100. In this exemplary embodiment, each modular robotic finger of the plurality of modular robotic fingers 104-110 have the same construction and configuration. In other embodiments, one or more of the modular robotic fingers of the plurality of modular robotic fingers 104-110 may have different configurations or may be omitted. Other configurations may include the inclusion of a tool, such as, but not limited to a powered or unpowered screw driver, if a particular tool is to be used frequently in some application, that cool can be directly attached to one of the receiving regions, rather than using the fingers to grasp the tool.

Each modular robotic finger in the plurality of modular robotic fingers 104-110 can comprise electrical contacts 209 (see FIG. 2A) that contact respective electrical contacts (not shown) of the frame 102 when a modular robotic finger is attached to the frame 102. For example, the frame 102 can comprise a first receiving region that includes first electrical contacts. The first modular robotic finger 104 can be removably attached to the frame 102 at the first receiving region. The first modular robotic finger 104 includes second electrical contacts that contact the first electrical contacts of the first receiving region of the frame 102 when the first modular robotic finger 104 is coupled to the frame 102 at the first receiving region. Accordingly, an electrical connection is formed between control circuitry included in the frame 102 and at least one motor in the first modular robotic finger, wherein the electrical connection is formed by way of spring contacts. Accordingly, the electrical connection formed between the motor of the first modular robotic finger 104 and the control circuitry of the frame 102 does not impede detachment of the first modular robotic finger 104 from the frame 102.

Each modular robotic finger in the plurality of modular robotic fingers 104-110 can respectively be removably attachable to the frame 102 at the respective receiving regions of the frame 102 by way of respective mechanical fuses, wherein a mechanical fuse is configured to trigger (break) when a corresponding modular robotic finger experiences a predefined load condition. For example, the first modular robotic finger 104 can be coupled to the first receiving region of the frame 102 by way of a first mechanical fuse, wherein the first mechanical fuse is configured to trigger upon the first modular robotic finger experiencing a predefined load condition. In an exemplary embodiment, the mechanical fuse can be configured to trigger when a normal force between the first receiving region of the frame 102 and the first modular robotic finger 104 exceeds a predefined threshold, thereby causing the first modular robotic finger 104 to detach from the frame 102. In another exemplary embodiment, the first mechanical fuse can be configured to trigger when a sheer force between the first receiving region of the frame 102 and the first modular robotic finger 104 exceeds a predefined threshold, thereby causing the first modular robotic finger 104 to detach from the frame 102.

In this exemplary embodiment, the mechanical fuse can be formed through utilization of magnets. Specifically, a first magnet (not shown), having a first polarity, can be positioned in the first receiving region of the frame 102 (not shown), and a second magnet 215 (see FIG. 2A), having a second polarity (opposite the first polarity), can be positioned in a proximal link of the first modular robotic finger 104, thereby forming a mechanical fuse between the proximal link of the first modular robotic finger 104 and the frame 102. In another embodiment, the frame and/or proximal link may include one or more magnets. In another example, the frame 102 can be at least partially formed by a ferromagnetic material, such that magnets in the proximal link of the first modular robotic finger 104 (and other modular robotic fingers) are attracted to the frame. In yet another example, the frame 102 can comprise magnets, and the plurality of fingers 104-110 can be at least partially composed of a ferromagnetic material.

As will be described in greater detail herein, joints in the modular robotic fingers 104-110 can include respective protection apparatuses, wherein a protection apparatus is configured to protect a respective motor that drives movement of a link about a joint that includes the protection apparatus. Generally, the protection apparatus is configured to protect the motor (and/or associated cabling and gearing) from sudden torque about the joint. In another exemplary embodiment, the robotic hand 100 can include a skin that covers at least a portion thereof. The skin is configured to emulate the elasticity of human skin in a direction normal to the skin surface, and further emulate stiffness of human skin in orthogonal directions that are tangential to the skin surface. In still yet another exemplary embodiment, movement of the robotic hand 100 can be controlled based upon angular displacement of phalanges of a human hand that are measured by an apparatus that is suitable for human hands of different shapes/sizes, and need not be calibrated.

Figure 2:
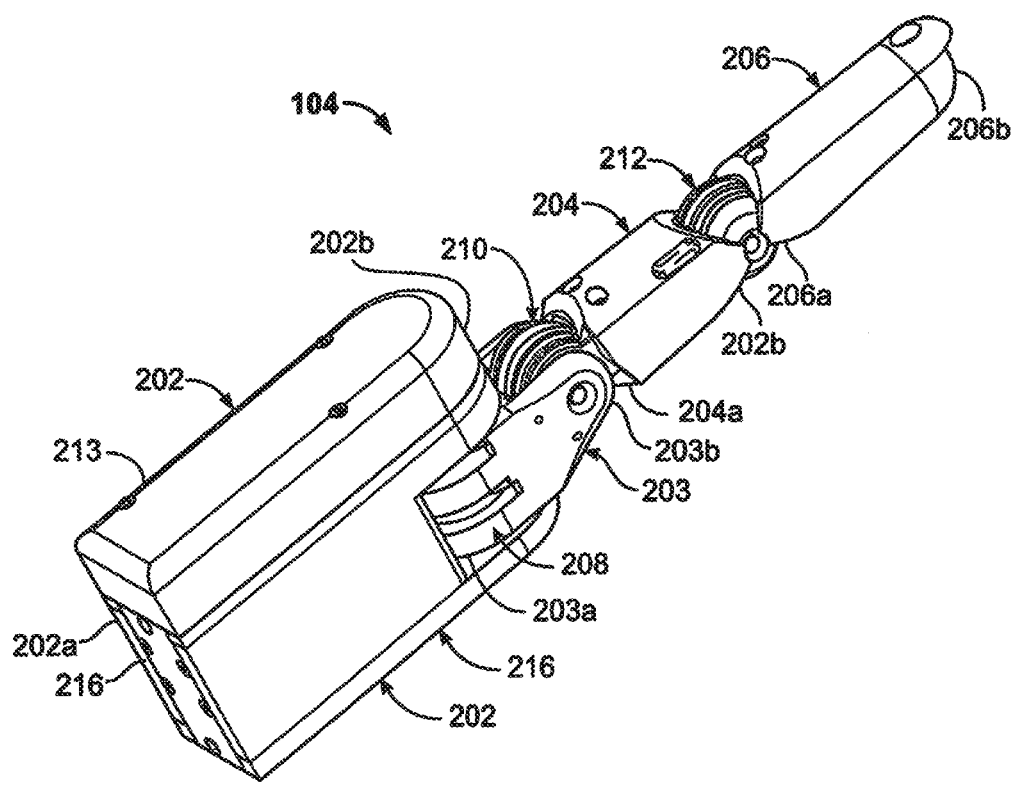
FIG. 2 illustrates a modular robotic finger according to an embodiment of the disclosure
Figure 2A:
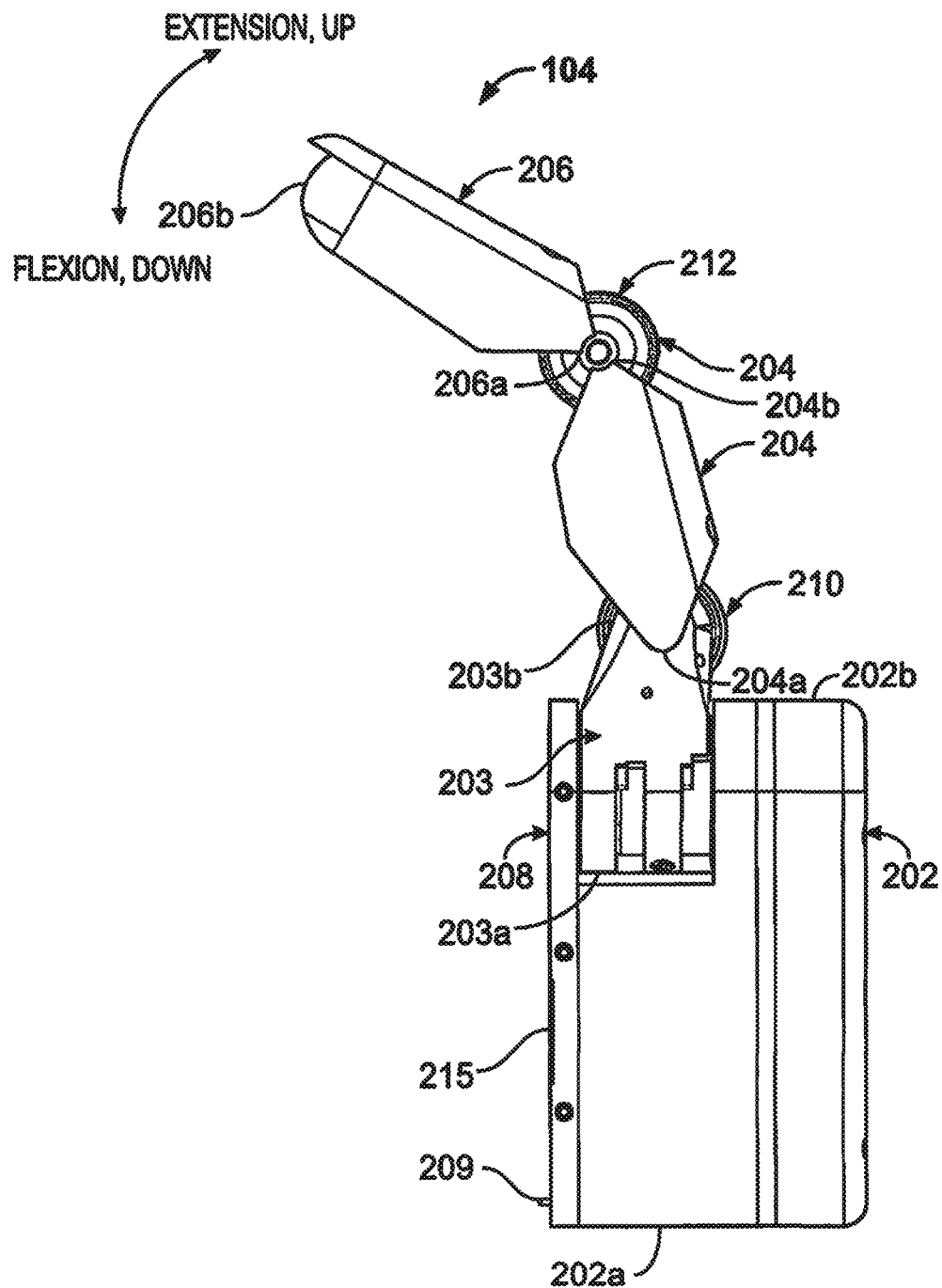
FIG. 2A illustrates a side view of the modular robotic finger of FIG. 2.
Figure 2B:
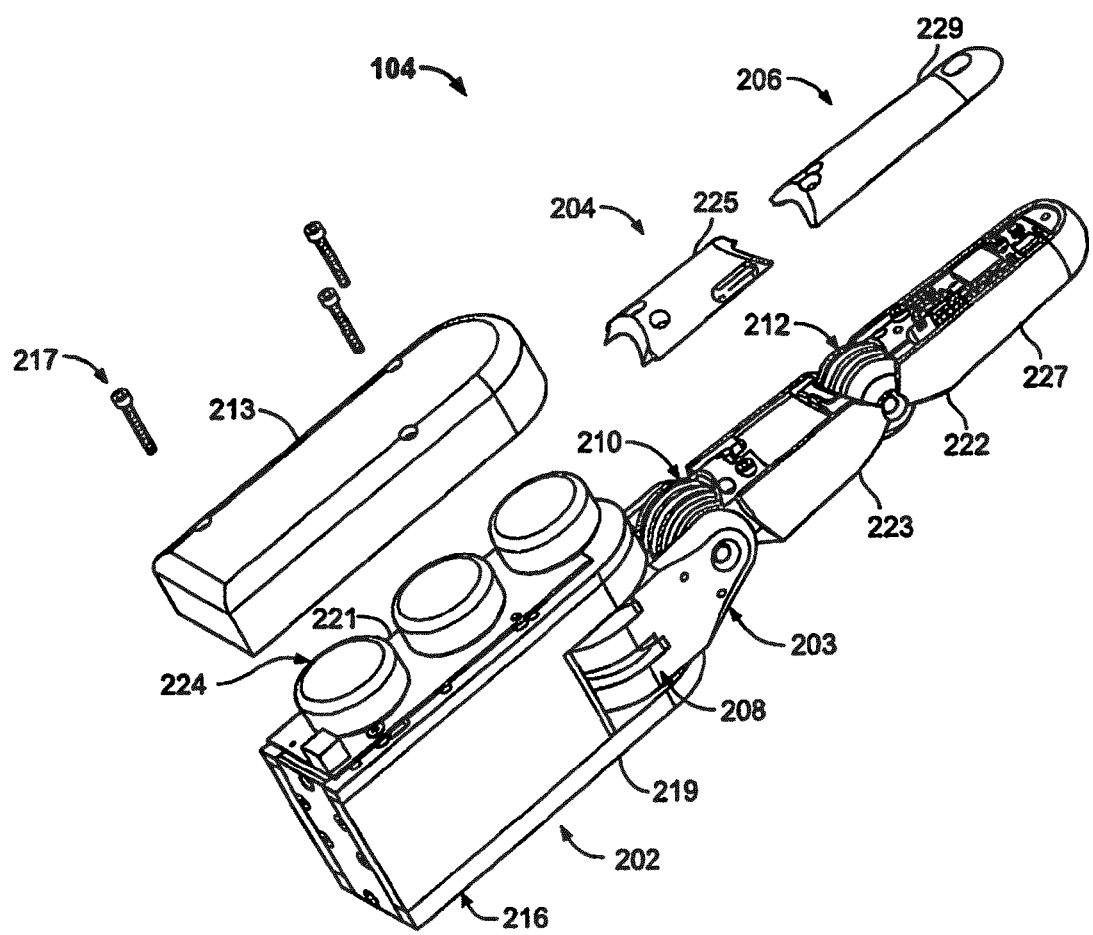
FIG. 2B illustrates a partially exploded view of the modular robotic finger of FIG. 2.
Figure 2C:
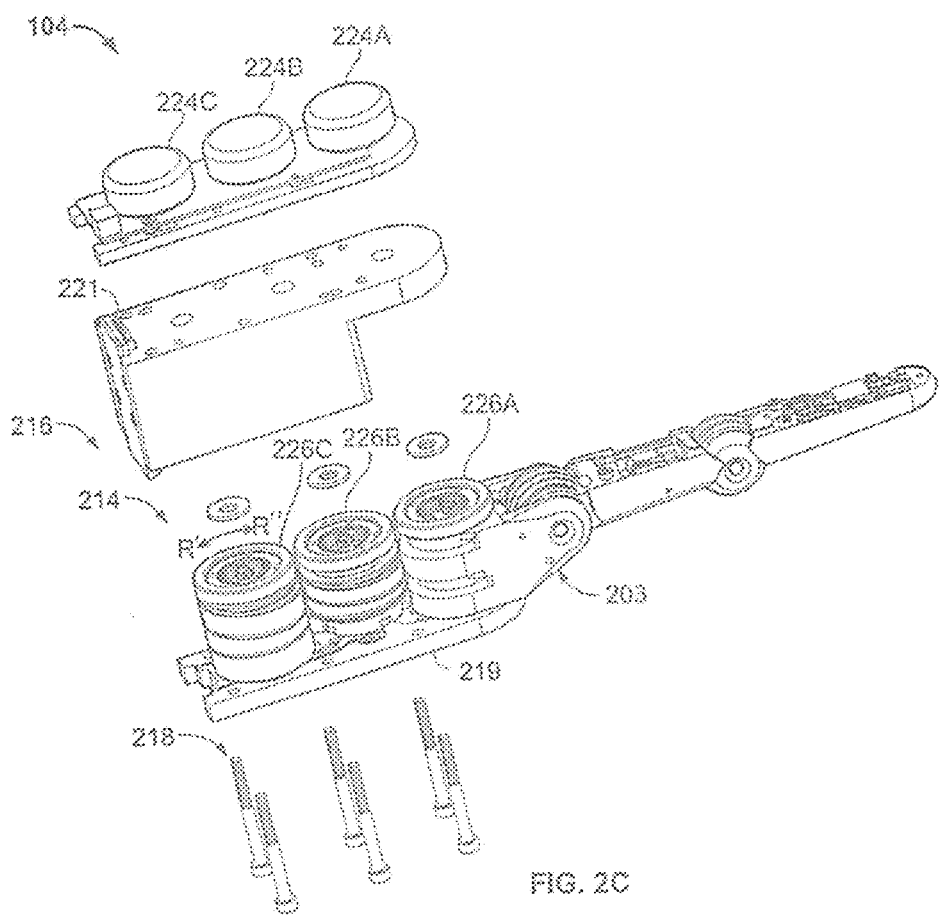
FIG. 2C illustrates a partially exploded partial view of the modular robotic finger of FIG. 2.
Figure 2D:
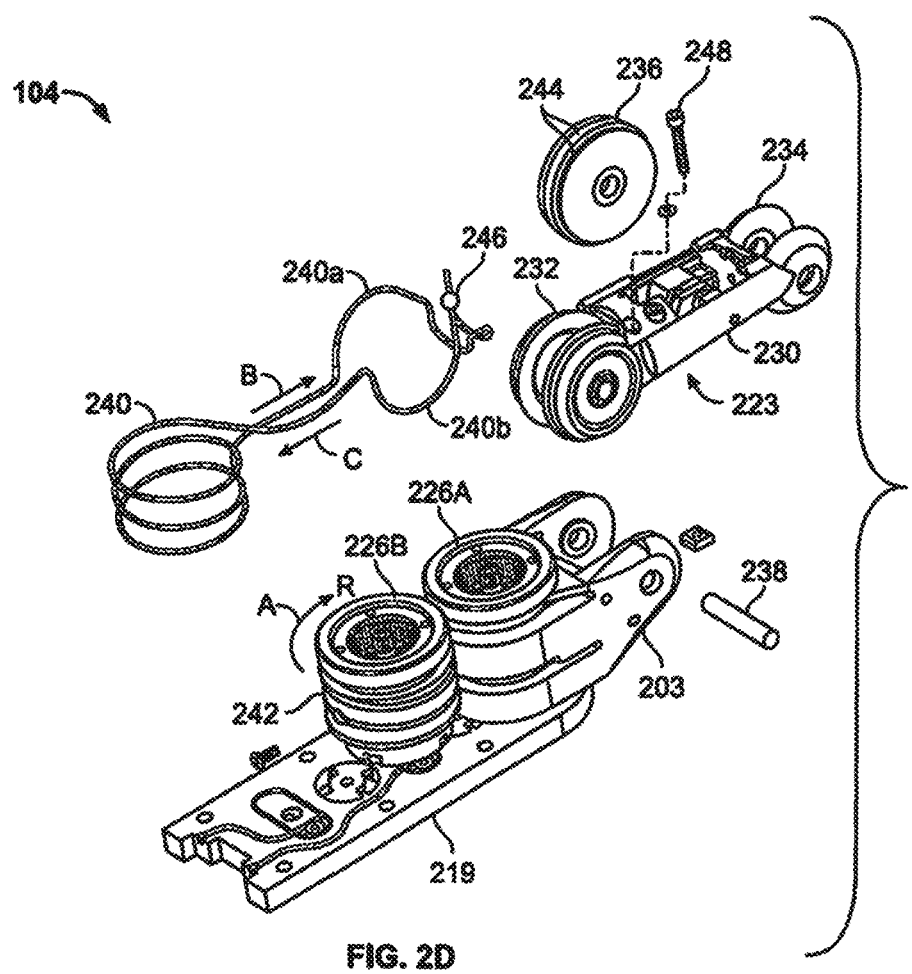
FIG. 2D illustrates another partially exploded partial of the modular robotic finger of FIG. 2.
Figure 2E:
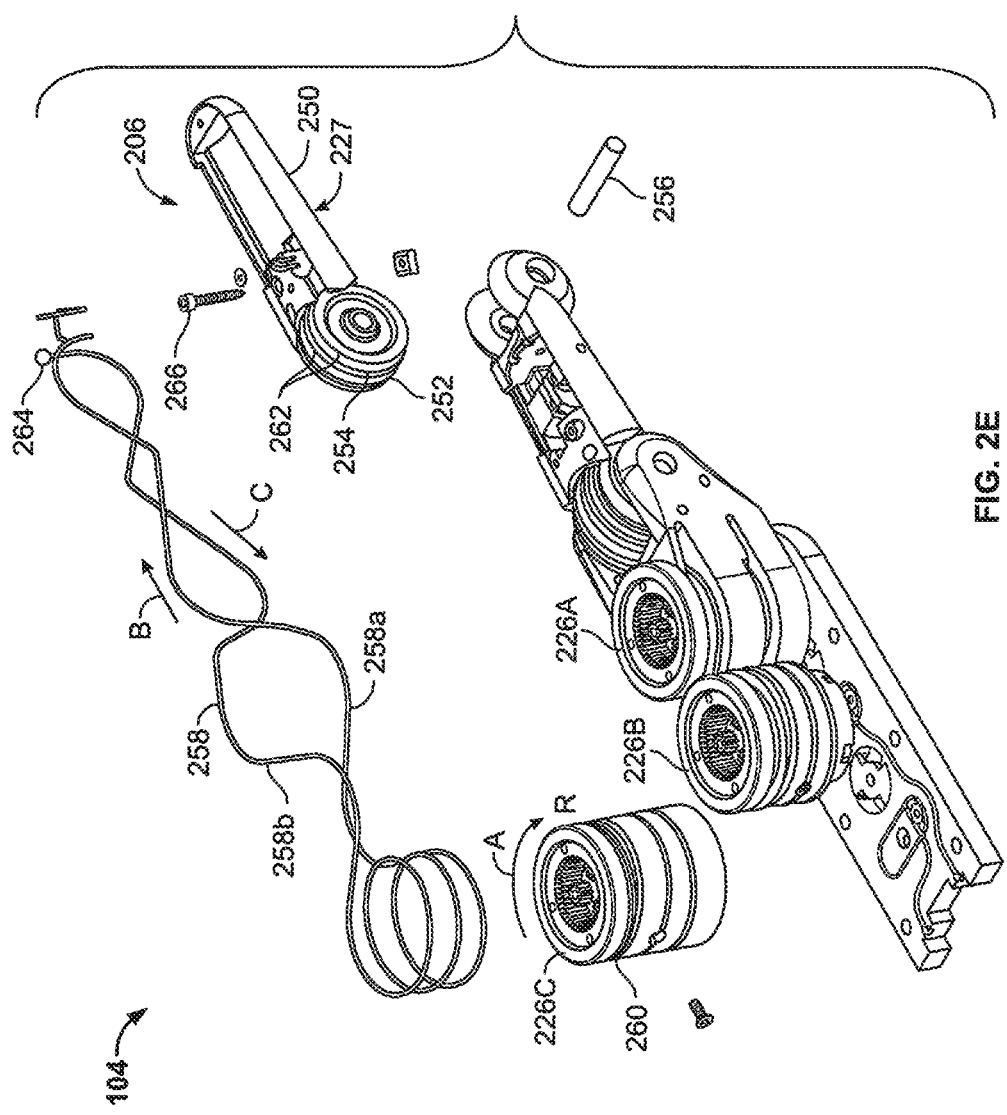
FIG. 2E illustrates another partially exploded partial view of the modular robotic finger of FIG. 2.

FIGS. 2-2E illustrate various views of a modular robotic finger according to an embodiment of the disclosure. With reference now to FIGS. 2 and 2A, a modular robotic finger 104 according to an embodiment of the disclosure is illustrated. The first modular robotic finger 104 includes a proximal link 202 that has a proximal end 202a and a distal end 202b, an intermediate link 203 that has a proximal end 203a and a distal end 203b, a medial or middle link 204 that has a proximal end 204a and a distal end 204b, and a distal link 206 that has a proximal end 206a and a distal end 206b. The first modular robotic finger 104 further comprises a first joint 208 that facilitates adduction and abduction (see FIG. 1) between the base link 202 and the intermediate link 203, a second joint 210 that facilitates flexion and extension (see FIG. 2A) between the intermediate link 203 and the middle link 204, and a third joint 212 that facilitates flexion and extension (see FIG. 2A) between the middle link 204 and the distal link 206. As is apparent, rotation of the first joint 208 not only abducts and adducts the intermediate link 203, but also the middle and distal links 204, 206 to which it is attached. As understood, adduction and abduction in this case refer to pivoting perpendicular to the plane of flexion and tension. With more particularity, the first joint 208 mechanically couples the distal end 202b of the proximal link 202 with the proximal end 203a of the intermediate link 203, the second joint 210 couples the distal end of the intermediate link 203 to the proximal end 204a of the middle link 204, and the third joint 212 mechanically couples the distal end 204b of the middle link 204 with the proximal end 206a of the distal link 206. This coupling is rigid with the exception of the one actuated rotation at each joint, as previously described.

Referring to FIGS. 2B and 2C, the proximal link 202 includes a motor cover 213 attached to a base 216 by fasteners 217. In this exemplary embodiment, the fasteners 217 are screws. In another embodiment, the fasteners may be screws, bolts, pins, clips, tabs or other fastening devices. The base 216 includes a base plate 219 and a drive pinion cover 221. The base includes a drive pinion cover 221 attached to a base plate 219 by fasteners 218

The modular robotic finger 104 includes motors 224 mechanically coupled to corresponding drive pinions 226 so as to rotate the drive pinions 226 in both an R and R' direction (see FIG. 2C). In this embodiment, a first motor 224A drives rotary motion of a first drive pinion 226A about the first joint 208, a second motor 2249 drives rotary motion of the second drive pinion 226B, and a third motor 224C drives rotary motion of the third drive pinion 226C. In another embodiment, a transmission, including but not limited to a planetary or harmonic drive gearhead may be placed between the motor and drive pinion to realize appropriate forces and speeds.

The middle link 204 includes a frame 223 and a cover 225, and the distal link 206 includes a frame 227 and a cover 229. The covers 225, 229 are attached to the frames 223, 227 by fasteners (not shown) and provide access to components of the medial and distal links 204, 206.

As can be seen in FIG. 2C, the intermediate link 203 is attached or coupled to the first drive pinion 224A, so that the rotation of the first drive pinion 224A about the first joint 208 rotates the intermediate link 203 around the first joint 208. In such a manner, the intermediate link 203, as well as the middle and distal links 204, 206 abducts and adducts (see FIG. 1).

FIG. 2D illustrates a partial exploded partial view of the modular finger 104. In FIG. 2D, the third motor 224C and associated cable (second cable 258) (see FIG. 2E), have been removed for clarity. As can be seen in FIG. 2D, the middle link frame 223 includes a base 230 having a proximal attachment portion 232. The frame 223 also includes a guide disk 236 that is disposed within the proximal attachment portion 232 as shown in FIGS. 2-2C. The middle link 204 is pivotally attached to the intermediate link 203 by pin 238 that passes through the proximal attachment portion 232 and the guide disk 236.

The modular robotic finder also includes a first cable 240 that wraps around slot 242 of the second drive pinion 226B so as to engage the second drive pinion 226B. The first cable 240 also engages the middle link 204 by passing over and under guide slots 242 in the in the guide disk 236. The first cable 240 is terminally attached at a terminal end 246 to the middle link 204 by screw 248.

The middle link 204 is flexed and extended, or in other words, pivoted down and up (see FIG. 2), by the second motor 224B rotating the second drive pinion 226B thereby engaging the first cable 240 to flex or tense the middle link 204. For example, driving the second drive pinion 226B in a clockwise direction A causes a first portion 240a of the first cable 240 to move in direction B while causing a second portion 240b to move in direction C. In such a manner, the middle link 204 is extended. Rotating the second drive pinion 226B in the opposite direction causes the middle link 204 to flex.

FIG. 2E illustrates a partial exploded partial view of the modular finger 104.

As can be seen in FIG. 2E, the distal link 206 includes frame 227 that includes a base 250 having a proximal attachment portion 252. The frame 227 also includes a guide disk 254 that is disposed within the proximal attachment portion 252, the guide disk 254 being similarly configured as guide disk 236 in the middle link. The distal link 206 is pivotally attached to the middle link 204 by pin 256 that passes through the proximal attachment portion 252 and guide disk 254.

The modular robotic finder also includes a second cable 258 that wraps around slot 260 of the third drive pinion 226C so as to engage the third drive pinion 226C. The second cable 258 also engages the distal link 206 by passing over and under guide slots 262 in the in the guide disk 254. The second cable 258 is terminally attached at a terminal end 264 to the distal link 206 by screw 266.

The distal link 206 is flexed and tensed, or in other words, pivoted up and down (see FIG. 2), by the third motor 224C rotating the third drive pinion 226C thereby engaging the second cable 258 to flex or tense the distal link 206. For example, driving the third drive pinion 226C in a clockwise direction A causes a first portion 258a of the second cable 258 to move in direction B while causing a second portion 258b to move in direction C. In such a manner, the distal link 204 is extended. Rotating the third drive pinion 226C in the opposite direction causes the distal link 206 to flex. In accordance with an example, an output shaft of the first motor can be mechanically coupled to the distal end of the proximal link 202, thereby facilitating adduction and abduction about the first joint 208. It can be ascertained, however, that sudden torque (e.g., having an amplitude above a threshold) applied about the first joint 208 may damage or destroy the first motor. For instance, the output shaft of the first motor can be rotating to cause adduction about the first joint 208. An external force applied to the medial link 204, however, may result in sudden torque about the first joint 208 that opposes the rotation of the output shaft of the first motor. Accordingly, a protection apparatus, as will be described in greater detail below, can be included in the first joint 208 (and the joints 210 and 212) to protect the first motor from the torque about the first joint 208.

For example, the protection apparatus can comprise an input plate and an output plate. The input plate is mechanically coupled to the output shaft of the first motor, such that the input plate is driven by the output shaft of the first motor. The output plate is mechanically coupled to the input plate, such that the output plate is driven by the input plate. The output plate is mechanically coupled to the proximal end of the medial link 204, such that rotation of the output plate causes rotation of the medial link 204 about the first joint 208. When there is no external force suddenly applied that creates torque about the first joint 208, or when the rate of change of the torque is below a first threshold, or the amplitude of the torque is below a second threshold, the input plate and the output plate of the protection apparatus rotate synchronously, such that rotation of the output shaft of the first motor causes rotation of the medial link 204 about the first joint 208. If, however, there is a sudden torque about the first joint 208 (e.g., the rate of change of torque about the first joint 208 exceeds the first threshold and the amplitude of the torque exceeds the second threshold), then the input plate and the output plate can rotate asynchronously; e.g., the output plate of the protection apparatus becomes angularly misaligned from the input plate of the protection apparatus. As will be described in greater detail below, the torque about the first joint 208 can be absorbed by a coil spring in the protection apparatus, such that the torque does not impact the first motor.

As noted above, the second joint 210 and the third joint 212 can also include protection apparatuses. In an exemplary embodiment, the proximal link 202 of the first modular robotic finger 104 can include a second motor and a third motor. The second motor drives rotary movement of the medial link 204 about the second joint 210 by way of a first cable, and the third motor drives rotary movement of the distal link 206 about the third joint 212 by way of a second cable. An input plate of a protection apparatus in the second joint 210 is coupled to the first cable, and an input plate of a protection apparatus in the third joint 212 is coupled to the second cable. Thus, when there is no torque created by external forces about the second joint 210 or the third joint 212, the second motor and the third motor drive the first cable and the second cable, respectively, which in turn drive the input plate of the protection apparatus in the second joint 210 and the input plate of the protection apparatus in the third joint 212. This, in turn, drives the output plates of the protection apparatuses (thereby driving rotary movement of the medial link 204 and/or the distal link 206 about the joints 210 and 212, respectively). When torque is suddenly applied with a relatively high amplitude, the protection apparatuses in the joints 208-212 absorb such torque, thereby protecting the motors in the proximal link 202.

Figures 3, 4:
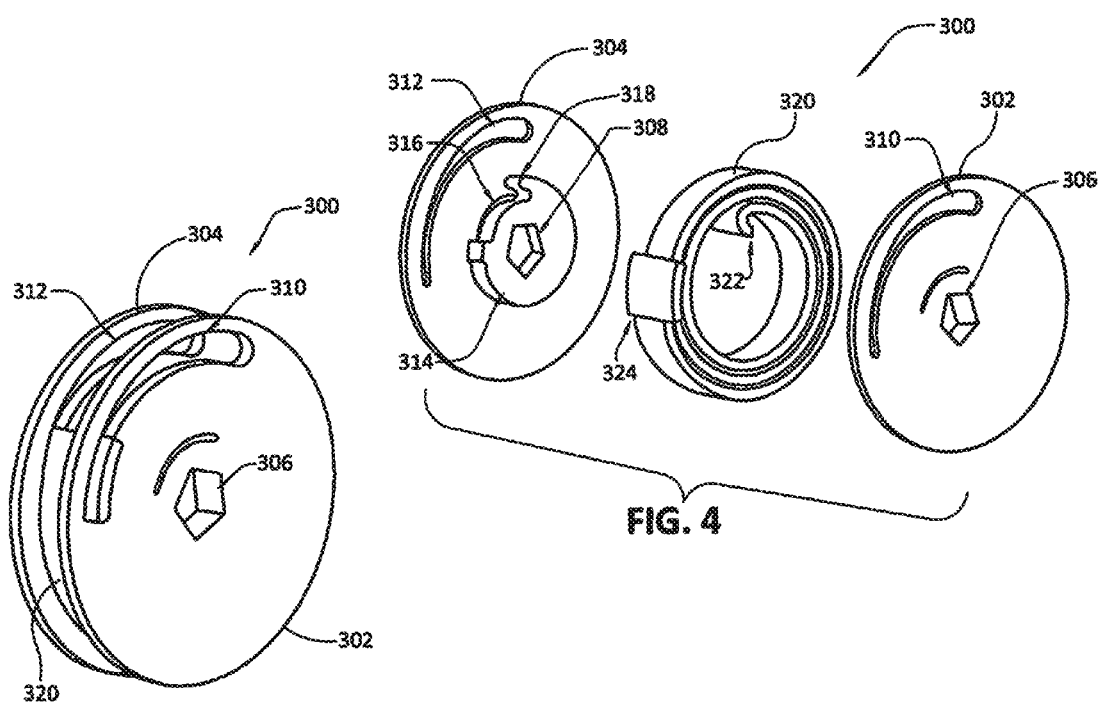
FIG. 3 is an isometric view of an exemplary protection apparatus that can included in a joint of a robotic finger.
FIG. 4 is an exploded view of the exemplary protection apparatus.

FIG. 3 depicts an isometric view of an exemplary protection apparatus 300, and FIG. 4 depicts an exploded view of the exemplary protection apparatus 300. Referring collectively to FIGS. 3 and 4, the protection apparatus 300 comprises an input plate 302 and an output plate 304. The input plate 302 is coupled to an input load, such as an output shaft of a servo motor. In the exemplary protection apparatus 300, the input plate 302 can comprise a first aperture 306 formed as a pentagon, which can receive an input shaft having a correspondingly shaped end. The output plate 304 can likewise comprise a first aperture 308 formed as a pentagon, which can receive an output shaft having a correspondingly shaped end.

The input plate 302 additionally includes a second aperture 310 that can optionally be tapered along its radial length, wherein the second aperture 310 tapers in a counterclockwise direction when the input plate 302 is viewed from its front. The output plate 304 includes a corresponding second aperture 312 that can likewise optionally be tapered along its radial length, wherein the second aperture 312 tapers in a clockwise direction when the output plate 304 is viewed from its front. Thus, as shown in FIG. 3, the second aperture 310 of the input plate 302 and the second aperture 312 of the output plate 304 can be aligned when no torque is applied about an axis of rotation of the protection apparatus 300.

An interior portion of the output plate 304 includes a raised circular mating region 314 that extends towards the input plate 302, and is located generally at a center of the output plate 304. The first aperture 308 of the output plate 304 is shown as extending through the mating region 314. The circular edge of the mating region 314 additionally includes a recessed region 316, wherein the recessed region 316 is formed to include a hook-shaped receiving slot 318. An optional aperture in the recessed region 316 extends through the output plate 304.

The input plate is 302 is a mirror image of the output plate 304. Accordingly, while not viewable from the view of the protection apparatus 300 shown in FIG. 3 and FIG. 4, the input plate 302 comprises a raised circular mating region that extends inwardly towards the output plate 304. The mating region of the input plate 302 includes a recessed region that is formed to include a hook-shaped receiving slot.

The protection apparatus 300 further includes a loaded coil spring 320 that mechanically couples the input plate 302 with the output plate 304. The coil spring 320 is spiral-shaped, and has a first end 322 and a second end 324. The first end 322 is formed as a hook that is turned inwardly towards a center of the spiral, and the second end 324 is located at an exterior of the spiral and formed as a T-junction, the T-junction having a first side and a second side that extend laterally from a remainder of the coil spring 320.

When the protection apparatus 300 is assembled, the coil spring 320 is loaded (wound). A first side of the T-junction at the second end 324 of the coil spring 320 is inserted in the second aperture 310 of the input plate 302 and a second side of the T-junction is inserted in the second aperture 312 of the output plate 304. The hook at the first end 322 of the coil spring 320 is positioned to mate with the hook-shaped receiving slot 318 of the output plate 304 and the corresponding hook-shaped receiving slot of the input plate 302 (not shown).

In operation, when the input plate 302 is driven by a motor, such that torque on the input plate 302 about an axis of rotation of the protection apparatus 300 is below a predefined threshold, the input plate 302 and the output plate 304 rotate synchronously. When, however, an external load coupled to the output plate 304 causes a sudden torque to be applied to the output plate 304, and torque at the output plate about the axis of rotation of the protection apparatus 300 exceeds the threshold, the input plate 302 and the output plate 304 rotate asynchronously (e.g., an angular displacement occurs between the input plate 302 and the output plate 304, such that the input plate 302 and the output plate 304 become misaligned).

With more particularity, when torque that is above the threshold is suddenly applied to the output plate 304, the coil spring 320 absorbs such force, thus protecting the motor coupled to the input plate 302 from being impacted by the force. In an exemplary operation of the protection apparatus 300, the protection apparatus 300 can be included in the second joint 210 of the first modular robotic finger 104. An external force may be applied to the medial link 204 of the robotic finger, thereby generating a sudden torque at the output plate 304 (e.g., where the torque exceeds the threshold) in a counterclockwise direction (when viewing the interior of the output plate 304). The output plate 304 thus rotates in the counterclockwise direction relatively quickly. When this occurs, the hooked first end 322 of the coil spring 320 remains mated with the corresponding hook-shaped receiving slot 318 of the output plate 304 while the output plate 304 rotates, thereby further loading the coil spring 320. While the output plate 304 rotates, the first side of the T-junction at the second end 324 of the coil spring 320 remains stationary in space, and does not prevent rotation of the output plate 304 due to the second aperture 312 of the output plate 304.

At the input plate 302, the hooked first end 322 of the coil spring 320 becomes unmated from the hooked-shaped receiving slot thereof (e.g., due to the hooked first end 322 remaining mated to the hook-shaped receiving slot 318 of the output plate 304 when the output plate 304 rotates). Thus, the input plate 302 remains relatively stationary, as the coil spring 320 absorbs the sudden torsion force. When the medial link 204 is no longer subjected to the external force, the coil spring 320 becomes uncoiled, thereby re-aligning the output plate 304 with the input plate 302.

The protection apparatus 300 can absorb sudden torque at the output plate 304 in either rotary direction. Continuing with the example set forth above, an external force may be applied to the medial link 204 that creates sudden torque at the output plate 304 in the clockwise direction about the axis of rotation of the protection apparatus 300. When such torque is above the threshold, the output plate 304 rotates in the clockwise direction, with the tapered end of the second aperture 312 of the output plate 304 grabbing the first side of the T-junction at the second end 324 of the coil spring 320. The hooked first end 322 of the coil spring 320 remains relatively stationary in space, and becomes unmated from the hook-shaped receiving slot 318 as the output plate 304 rotates, thereby further winding the coil spring 320.

At the input plate 302, the hooked first end 322 remains mated with the hook-shaped receiving slot thereof, and the second side of the T-junction of the second end 324 of the coil spring 320 slides in a clockwise direction in the second aperture of the input plate 302. Thus, the input plate 302 remains relatively stationary as the output plate 304 rotates, as the torque is absorbed by the coil spring 320. When the output plate 304 is no longer subject to the torque, the coil spring 320 uncoils, thereby rotating the output plate 304 back into alignment with the input plate 302. It can thus be ascertained that the protection apparatus 300 is designed to cause the coil spring 320 to absorb sudden torque applied to the output plate 304, such that a motor coupled to the input plate 302 is buffered from such torque.

Figure 5:
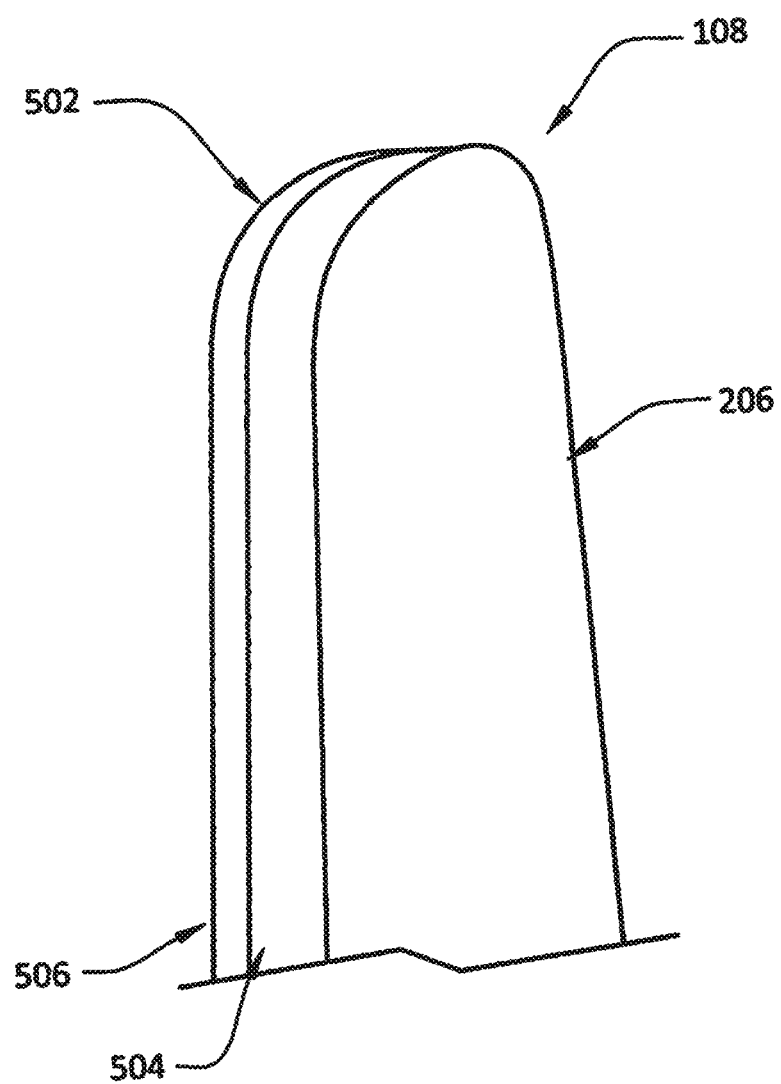
FIG. 5 illustrates a distal link of an exemplary robotic finger that comprises an anthropomorphic skin.

With reference now to FIG. 5, an exemplary depiction of the distal link 206 of the first modular robotic finger 104 is illustrated. In an exemplary embodiment, at least an inner region 502 of the distal link 206 can comprise an anthropomorphic skin that can be particularly well-suited for grasping and releasing objects. The anthropomorphic skin comprises an internal layer 504 composed of a first material, and an external layer 506 composed of a second material. The internal layer 504 can have a first thickness, while the external layer 506 can have a second thickness, which is less than the first thickness. Moreover, the external layer 506 can have a stiffness that is greater than a stiffness of the internal layer 504.

In an exemplary embodiment, the internal layer 504 can be formed of silicone with a thickness of approximately 4 mm, while the exterior layer can also be formed of silicone (e.g., a different type of silicone) with a thickness of approximately 1 mm. Further, the external layer 506 can have a durometer of shore A 20, and the internal layer 504 can have a durometer of shore OO 10. Accordingly, rather than the skin being a single, thin, stiff, homogeneous material, the anthropomorphic skin can be composed of the external layer 506 (which is a thin layer composed of a stiffer material) and the internal layer 504 (which is a thicker layer composed of a stiffer material). The two-layer skin is associated with superior performance when compared to a conventional one-layer skin utilized in robotic hands, with respect to grasping and manipulating objects. Specifically, the two-layer skin can replicate human skin for robotic hands, where it is very elastic in the direction normal to the skin surface, but far more stiff in orthogonal directions that are tangential to the skin surface.

Figure 6:
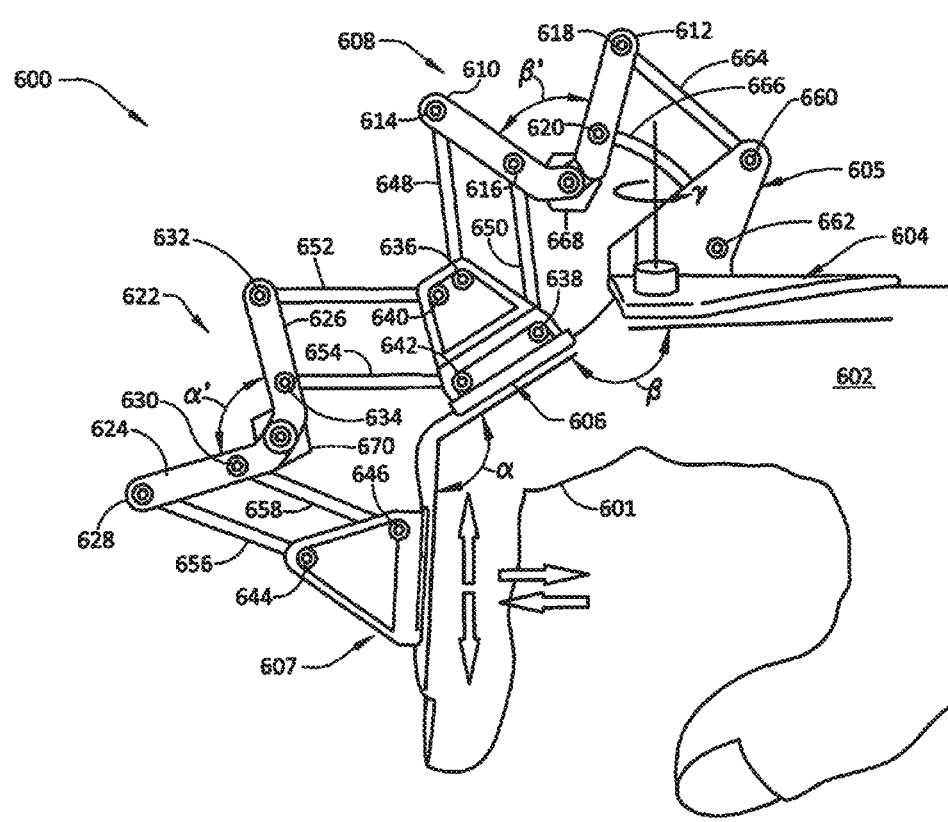
FIG. 6 illustrates an exemplary wearable mechanism that facilitates measurement of angles between phalanges of a finger.

With reference now to FIG. 6, an exemplary apparatus 600 that can be used in connection with computing relative angles between phalanges of human fingers is illustrated. The apparatus 600 is shown as being coupled to a pointer finger 601 of a hand 602. It is to be understood, however, that apparatuses such as the apparatus 600 can be simultaneously placed on multiple fingers. The apparatus 600 comprises a first plate 604 that is configured to be positioned flat on a metacarpal bone of the pointer finger 602, wherein a support plate 605 extends orthogonally from the first plate 604. A first hinge mechanism 606 is configured to be positioned flat on the proximal phalange of the pointer finger 602, and a second hinge mechanism 607 is configured to be positioned flat on the medial phalange of the pointer finger 602.

The apparatus 600 further comprises a first hinge 608, wherein the first hinge 608 comprises a first hinge arm 610 and a second hinge arm 612. The first hinge arm 610 comprises connector points 614 and 616 positioned along the length of the first hinge arm 610, and the second hinge arm 612 comprises connector points 618 and 620 positioned along the length of the second hinge arm 612. The apparatus 600 further comprises a second hinge 622, wherein the second hinge 622 comprises a third hinge arm 624 and a fourth hinge arm 626. The third hinge arm 624 comprises connector points 628 and 630 positioned along the length of the third hinge arm 624, and the fourth hinge arm 626 comprises connector points 632 and 634 positioned along the length of the fourth hinge arm 626.

The first hinge mechanism 606 includes a first pair of connector points 636 and 638 extending along a length of a first side of the first hinge mechanism 606 (e.g., a side facing the metacarpal bone of the pointer finger 601). A line extending through the connector points 636 and 638 is in parallel with a line extending through the connector points 614 and 616 of the first hinge arm 610 of the first hinge 608. The first hinge mechanism 606 further includes a second pair of connector points 640 and 642 extending along a length of a second side of the first hinge mechanism 606 (e.g., a side facing the medial phalange of the pointer finger 601). A line extending through the connector points 640 and 642 is in parallel with a line extending through the connector points 632 and 634 of the fourth hinge arm 626 of the second hinge 622. The second hinge mechanism 607 comprises a third pair of connector points 644 and 646 extending along a length of a first side of the second hinge mechanism 622 (e.g., a side facing the proximal phalange of the pointer finger 601). A line extending through the connector points 644 and 646 is in parallel with a line extending through the connector points 628 and 630 of the third hinge arm 624 of the second hinge mechanism 622.

A first pair of parallel bars 648 and 650 of equal length are connected to the first hinge mechanism 606 at the connector points 636 and 638, respectively, and are connected to the first hinge arm 610 of the first hinge 608 at the connector points 614 and 616, respectively. The bar 648 can pivot about the connector point 636 and the connector point 614, and the bar 650 can pivot about the connector point 638 and the connector point 616.

A second pair of parallel bars 652 and 654 of equal length are connected to the first hinge mechanism 606 at the connector points 640 and 642, respectively, and are connected to the fourth hinge arm 626 of the second hinge 622 at the connector points 632 and 634, respectively. The bar 652 can pivot about the connector point 632 and the connector point 640, and the bar 654 can pivot about the connector point 634 and the connector point 642.

A third pair of parallel bars 656 and 658 of equal length are connected to the second hinge mechanism 607 at the connector points 644 and 646, respectively, and are connected to the third hinge arm. 624 of the second hinge 622 at the connector points 628 and 630, respectively. The bar 656 can pivot about the connector point 628 and the connector point 644, and the bar 658 can pivot about the connector point 630 and the connector point 646.

The support plate 605 includes a pair of connector points 660 and 662. A straight bar 664 is connected to the connector point 660 of the support plate 605 and the connector point 618 of the second hinge arm 612 of the first hinge 608. A curved bar 666 is connected to the connector point 662 of the support plate 605 and the connector point 620 of the second hinge arm 612 of the first hinge 608.

A first sensor 668 is positioned relative to the first hinge 608 to output a signal that is indicative of an angle (β') between the first hinge arm 610 and the second hinge arm 612. A second sensor 670 is positioned relative to the second hinge 622 to output a signal that is indicative of an angle (∝') between the third hinge arm 624 and the fourth hinge arm 626 of the second hinge 622. A third sensor (not shown) can be configured to measure adduction/abduction of the pointer finger 601 directly. The first sensor 668 and the second sensor 670 can be Hall Effect sensors, potentiometers, optical sensors, etc.

The apparatus 600 can be utilized to compute a bend angle (β) between the metacarpal bone and the proximal phalange of the pointer finger 601 and a bend angle (∝) between the proximal phalange and the medial phalange of the pointer finger 601. Further, the apparatus 600 can be used to relatively precisely compute such angles regardless of size/shape of a hand upon which the apparatus 600 is situated. Specifically, regardless of size and shape of a hand, a position of the first plate 604 relative to the first hinge mechanism 606 remains constant. As shown by the arrows in FIG. 6, however, the position of the second hinge mechanism 607 relative to the first hinge mechanism 606 can alter. Due to the structure of the apparatus 600, the angles (∝') and (β') are indicative of (∝) and (β) regardless of size of the hand 602. Specifically, a function that maps angles (∝') and (β') to the angles (∝) and (β), respectively, can be learned when the apparatus 600 is fixed to the hand 602.

Figure 7:
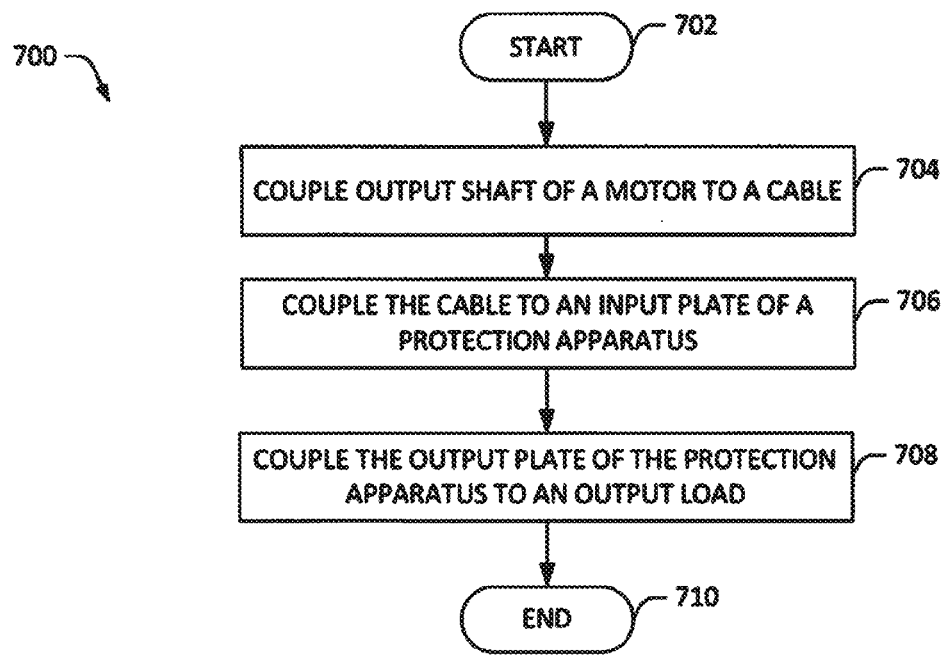
FIG. 7 is a flow diagram that illustrates an exemplary methodology for constructing a robotic finger that includes a protection apparatus.
Figure 8:
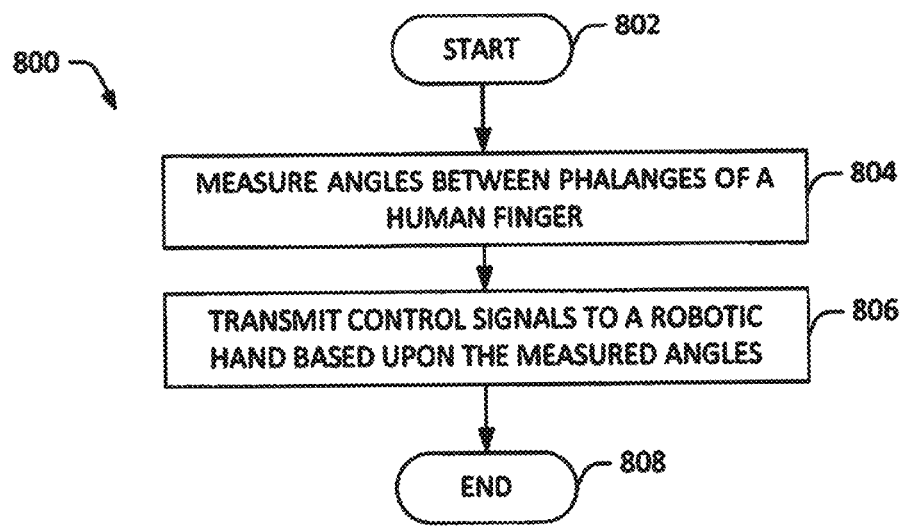
FIG. 8 is a flow diagram that illustrates an exemplary methodology for controlling a robotic hand based upon measured angles between phalanges of a finger.

FIGS. 7-8 illustrate exemplary methodologies relating to a robotic hand. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

With reference now to FIG. 7, an exemplary methodology 700 that facilitates utilizing a protection apparatus to protect a motor from an externally-applied force is illustrated. The methodology 700 starts at 702, and at 704, an output shaft of a motor is coupled to a cable. At 706, the cable is coupled to an input plate of a protection apparatus, such as the input plate 302 of the protection apparatus 300. At 708, the output plate of the protection apparatus is coupled to an output load. Thus, for example, the output plate 304 of the protection apparatus 300 can be coupled to an output shaft that drives rotary motion of a robotic link. The methodology 700 completes at 710.

Turning now to FIG. 8, an exemplary methodology 800 for controlling a robotic hand is illustrated. The methodology 800 starts at 802, and at 804, angles between phalanges of a human finger are measured. Pursuant to an example, the apparatus 600 can be utilized to measure such angles. At 806, control signals are transmitted to a robotic hand based upon the measured angles. For instance, the control signals can cause the robotic hand to mimic the motion of the hand that is wearing the apparatus 600. The methodology 800 completes at 808.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A mechanical finger comprising:
    a base link comprising a proximal end and a distal end, wherein the proximal end comprises at least one magnet configured to attach the mechanical finger to a frame;
    an intermediate link comprising a proximal end and a distal end, wherein the proximal end is attached to the distal end of the base link at a first joint configured to provide adduction and abduction between the base link and the intermediate link;
    a middle link comprising a proximal end and a distal end, wherein the proximal end is attached to the distal end of the intermediate link at a second joint configured to provide flexion and extension between the intermediate link and the middle link; and
    a distal link comprising a proximal end and a distal end, wherein the proximal end is attached to the distal end of the middle link at a third joint configured to provide flexion and extension between the middle link and the distal link;
    wherein the base link comprises;
    a first motor mechanically coupled to the intermediate link to drive the adduction and abduction between the base link and the intermediate link at the first joint;
    a second motor engaged to a first cable mechanically coupled to the middle joint to drive the flexion and extension between the intermediate link and the middle link at the second joint;
    a third motor engaged to a second cable mechanically coupled to the distal link to drive the flexion and extension between the middle link and the distal link at the third joint;
    wherein the mechanical finger includes no components that mechanically connect to a frame or a support that operates the mechanical finger.

2. The mechanical finger of claim 1, wherein the first motor rotates a first drive pinion directly coupled to the intermediate link.

3. The mechanical finger of claim 1, wherein the second motor rotates a second drive pinion coupled to the first cable.

4. The mechanical finger of claim 1, wherein the third motor rotates a third drive pinion coupled to the second cable.

* * * * *